Nov. 18, 1958  J. PERRACHIONE  2,860,881

CHUCK

Filed July 18, 1955  4 Sheets-Sheet 1

Jean Perrachione,
Inventor.
Koenig and Pope,
Attorneys.

Nov. 18, 1958

J. PERRACHIONE 2,860,881

CHUCK

Filed July 18, 1955

Jean Perrachione
Inventor.
Koenig and Pope,
Attorneys.

Nov. 18, 1958  J. PERRACHIONE  2,860,881
CHUCK
Filed July 18, 1955  4 Sheets-Sheet 3

Jean Perrachione,
Inventor.
Koenig and Pope,
Attorneys.

Nov. 18, 1958

J. PERRACHIONE 2,860,881

CHUCK

Filed July 18, 1955

United States Patent Office

2,860,881
Patented Nov. 18, 1958

2,860,881

CHUCK

Jean Perrachione, Country Club Hills, Mo., assignor to John Ramming Machine Company, St. Louis, Mo., a corporation of Missouri Application July 18, 1955, Serial No. 522,427

10 Claims. (Cl. 279—4)

This invention relates to chucks, and more particularly to power-operated universal chucks.

The invention is an improvement upon the chuck shown in United States Patent 2,597,280 dated May 20, 1952.

Among the several objects of the invention may be noted the provision of an improved chuck of the class shown in said Patent 2,597,280, and particularly for use in a pipe threading machine such as is shown in United States Patent 2,694,815 dated November 23, 1954, which is adapted for use either as a front or a rear chuck, having radially movable holders adapted to carry jaws for gripping a pipe or the like when used as a front chuck, and adapted to carry flange grippers when used as a rear chuck; the provision of a chuck of this class which is better sealed against entry of dirt and chips; the provision of a chuck of this class of such construction as to allow for threading a pipe or the like held in the jaws substantially right up to the face of the jaws; and the provision of a chuck of this class capable of quicker adjustment for size. Other objects and features will be in part apparent and in part pointed out hereinafter.

In the accompanying drawings, in which several of various possible embodiments of the invention are illustrated, Fig. 1 is a small-scale side elevation of a chuck embodying the invention;

Corresponding reference characters indicate corresponding parts throughout the several views of the drawings.

Figure 1:
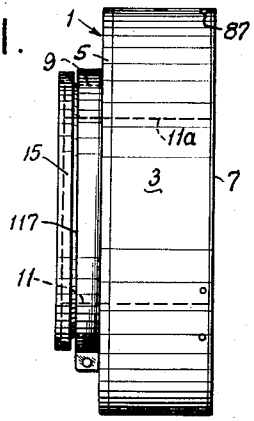
Figure 2:
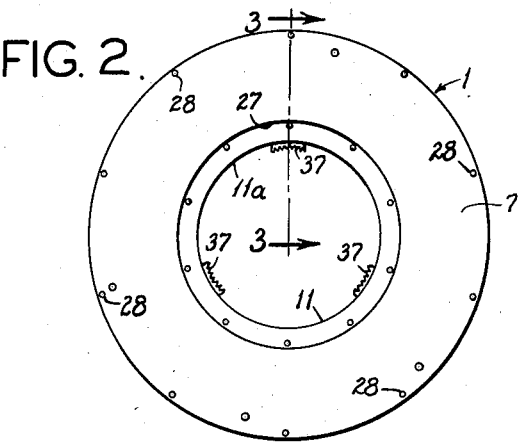
Fig. 2 is an end elevation, viewed from the right of Fig. 1.

Referring to the drawings, a chuck of this invention is shown to comprise an annular housing 1. This comprises a ring 3 and a head 5 for the ring 3 at the rearward end of the chuck. The forward end of the ring 3 is closed by a removable closure or cover plate 7. The rearward end head 5 is formed with a hub 9. This extends rearward from the head 5 and has a central opening 11. Fastened to the end of the hub 9 as by screws 13 is an adaptor 15 by means of which the chuck is mounted on a machine tool (not shown). For example, the chuck may be mounted on the arbor of the headstock of a pipe threading machine such as is shown in United States Patent 2,694,815. At 17 is indicated a spider member. This comprises a sleeve 19 having a flange 21 at its forward end. The rearward end of the sleeve is received in a central annular groove 23 in the hub 9, and is fastened to the hub by screws 25. The spider 17 extends from the hub 9 to the cover plate 7. The sleeve 19 defines an extension 11a of the hub opening 11. Opening 11, 11a is of relatively large diameter for the reception of workpieces up to a relatively large diameter (pipe up to twenty inches in diameter, for example). The cover plate 7 has a central opening 27 of somewhat larger diameter than the opening 11, 11a. The cover plate is secured to the forward end of the housing ring 3 and to the forward end flange 21 of the spider 17 by screws as indicated at 28, and does not rotate.

The forward end of the sleeve 19 and the flange 21 of the spider 17 are provided with three radial slots 29 spaced at 120° intervals. Radially slidable in each one of the slots 29 is a jaw carrier 31. Each jaw carrier 31 has a pair of lateral keys 33 which are slidable in keyways 35 provided in the edges of flange 21 at the sides of the respective slot 29. Each jaw carrier has a gripping jaw 37 fastened to its inner end as by screws 39, and has a recess 41 in its outer end. The recess 41 is open at the rearward face and at the radially outer end of the jaw carrier. Radially slidable in each recess is a cam follower assembly generally designated 43. Each assembly 43 comprises a U-block 45 positioned in the recess with its open end directed radially inward. The sides of the U-block are designated 47 and its head is designated 49. The sides 47 are in sliding engagement with the sides of recess 41 and the head 49 is located outward of the outer end of the jaw carrier. The U-block straddles a pressure block 51 accommodated in the recess. The U-block and the pressure block are retained in the recess by clamp members 53 secured to the jaw carrier by screws 55.

The pressure block has an outer end face 57 inclined toward the axis of the chuck and divergent from the head of the U-block in rearward direction (i. e., in the direction toward the end head 5 of the housing). Associated with each jaw carrier and the respective U-block and pressure block is a wedge 59 which extends between the inclined face 57 of the pressure block and the inside of the head 49 of the U-block. Rods 61 extend from the inner ends of the sides 47 of the U-block through openings 63 in the jaw carrier. These openings are constricted at their upper ends to provide inwardly facing shoulders 65. Compression springs 67 located in the openings 63 surrounding rods 61 react from heads 68 on the inner ends of the rods against the shoulders 65 to bias the jaw carriers 31 radially outward toward the U-blocks.

The housing ring 3 is provided with an internal annular recess 69 at its forward end. The shoulder at the inner end of this recess is designated 71. A cam ring 73 is rotary in the housing ring 3, fitting in the recess 69 and bearing against the shoulder 71. This cam ring surrounds the U-blocks 45 and the jaw carriers 31. It is internally formed with three spiral cam surfaces 75 for driving engagement with the heads 49 of the U-shaped blocks. On the forward face of the cam ring there are three spiral cam ridges 77. The internal surfaces of these ridges are coextensive with surfaces 75 and the outer surfaces 79 of these ridges are parallel to surfaces 75. Each cam follower assembly 43, in addition to the U-block 45, comprises a plate 81 fastened to the U-block by screws 83 and carrying a cam follower roller 85 in engagement with the outer surface 79 of a respective ridge 77 for positive-motion connection of follower assemblies 43 and cam ring 73. The internal cam surfaces 75 and the outer surfaces 79 of the cam ridges are spirally developed so that the cam ring 73 is rotary in one direction to move the follower assemblies 43 radially inward and in the opposite direction to move the follower assemblies radially outward. For rotating the cam ring, the housing ring 3 has a slot 87 adapted for entry of a handle (not shown), the cam ring having a series of sockets 89 for receiving the handle.

The chuck is provided with means for driving the wedges 59 axially in one direction or the other in the housing 1, with the wedges free for radial movement relative to the driving means. As shown, this driving means comprises a pressure plate 91 having a hub 93 which is slidable on the sleeve 19. Springs 95 reacting from the spider flange 21 bias the pressure plate in rearward direction. Rods for the springs 95 are indicated at 96. The rearward end of each wedge 59 is provided on opposite sides with grooves 98 for sliding engagement with a pair of parallel rails 97 secured to the forward face of the pressure plate 91. There are three such pairs of rails, spaced at 120° intervals on the forward face of the pressure plate.

Mounted on the inside of the rearward end head 5 are air cylinders 99. Ten of these are shown. Extending axially of each air cylinder is a piston pin 101. This pin has a head 103 secured in a recess 104 in the outside of the head 5 by screws 105, and extends through an opening 107 in the head 5. In each cylinder is a piston 109 slidable on the respective pin 101. Each piston has a forward cup-shaped extension 111 engaging the rearward side of the pressure plate 91. The hub 9 has axial air passages 113 leading to the respective air cylinders and radial air passages 115 leading to passages 113 from the periphery of the hub. Surrounding the hub 9 is a distributor ring 117 having an internal groove 119 in communication with the radial air passages 115. The distributor ring has a port for the supply and exit of air from the groove 119.

Operation is as follows:

Assuming, for example, that the chuck is mounted on the arbor of the headstock of a pipe threading machine, suitable means (not shown) will be provided for holding the distributor ring 117 against rotation, the remainder of the chuck being rotary with the arbor. Assuming that large-diameter workpieces are to be held in the chuck, the cam ring 73 will be rotated to such a position that the jaw carriers 31 are located at the outer limit of their radial movement (see Fig. 3). In this position of the jaw carriers, jaws 37 are clear of the largest-diameter workpiece to be accommodated. After a workpiece has been introduced into the chuck, extending through the opening 11, 11a, compressed air is supplied to the groove 119 in the distributor ring 117, thereby to supply compressed air via passages 115 and 113 to the air cylinders 99 behind the pistons 109, thereby driving the pressure plate 91 forward. This drives the wedges 59 forward between the heads 49 of the U-blocks 45 and the pressure blocks 51, thereby forcing the jaw carriers 31 and the jaws 37 inward against the bias of springs 67 to grip the workpiece. After the completion of operations on the workpiece, release is effected by venting the air from the air cylinders and the distributor ring, whereupon the springs 95 move the pressure plate 91 rearward to retract the wedges 59. The springs 67 are thereupon effective to move the jaw carriers and the jaws radially outward to their original position. The gripping and releasing operations may be performed either while the chuck is stationary or rotating.

For smaller sizes of workpieces, the jaw carriers 31 are initially adjusted to radial position wherein, with the wedges 59 in retracted position, the jaws 37 are slightly clear of the particular size of workpiece. This initial adjustment is made by rotating the cam ring 73 to move the jaw carriers 31 radially inward to a point where the jaws 37 are slightly clear of the size of workpiece to be inserted. It will be understood that upon such adjustment of the jaw carriers, the wedges 59 are moved radially inward without axial movement, the wedges being free for radial movement by reason of having sliding connections with the pressure plate 91. After this initial adjustment has been made, and the workpiece inserted in the chuck, the air may be turned on to drive the wedges forward to effect radially inward movement of the jaw carriers 31 for gripping the workpiece in the same manner as above described.

Figure 9:
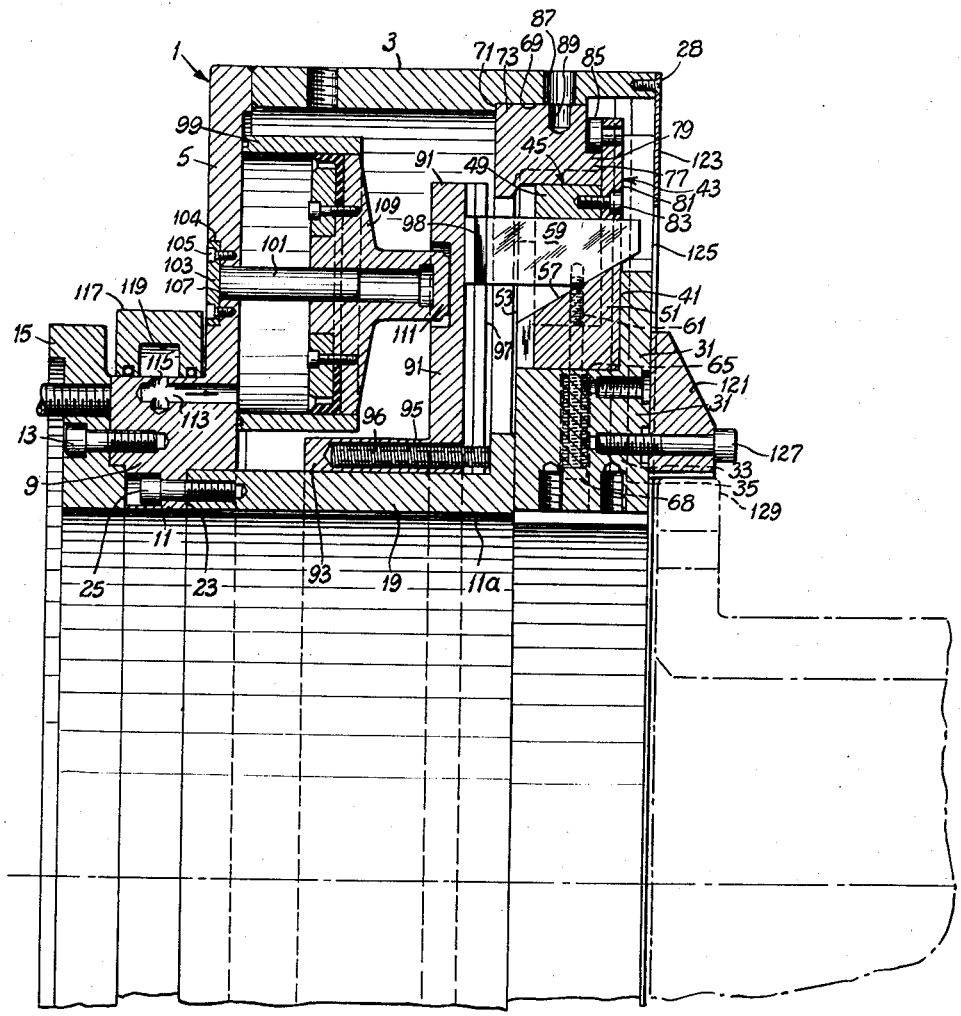
Fig. 9 is a view similar to Fig. 3 showing a modification, and also showing a moved position of parts.

Fig. 9 illustrates the adaptation of the chuck for use as a rear chuck carrying flange grippers indicated at 121. In this case, the cover plate 7 is replaced by a plate 123 having radial slots 125 in line with the slots 29 in the flange 21 of the spider 17. The flange grippers are secured as by screws 127 to the outer faces of the jaw carriers 31. A workpiece gripped by the flange grippers is shown in phantom at 129 in Fig. 9. Fig. 9 also shows the forward position of the pistons 109, the pressure plate 91 and the wedges 59.

Figure 3:
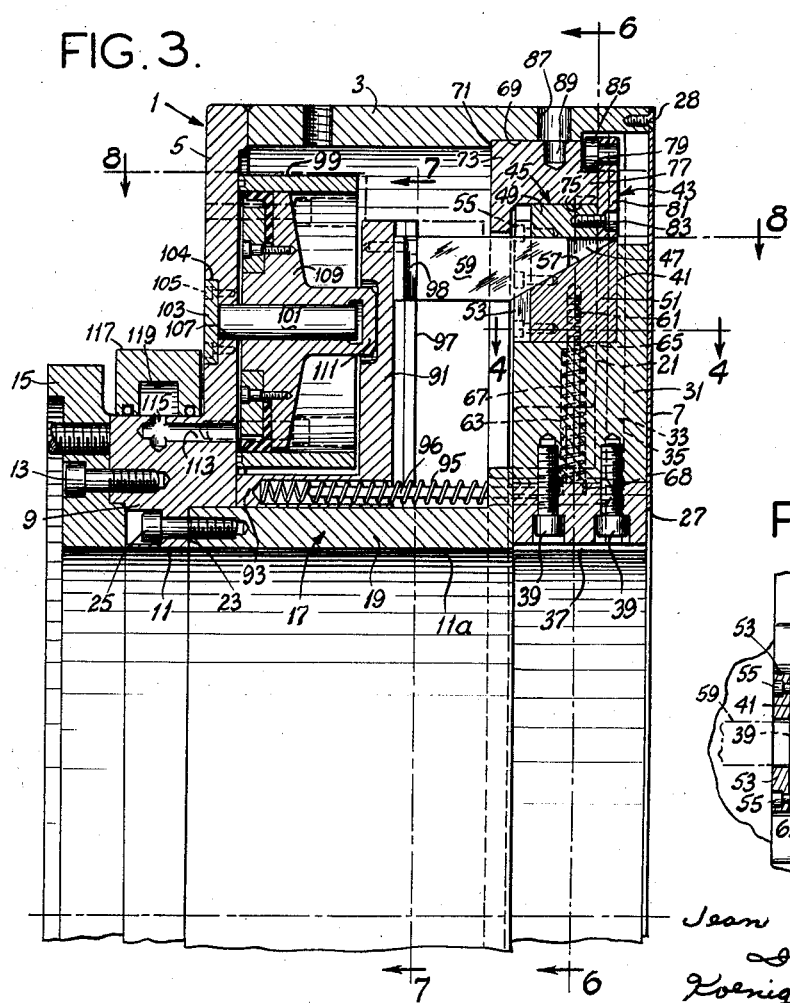
Fig. 3 is an enlarged longitudinal half-section taken on line 3—3 of Fig. 2.
Figure 4:
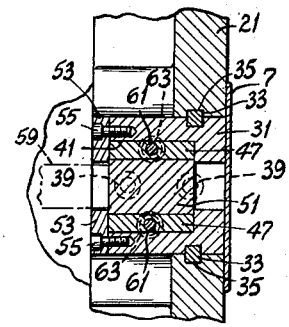
Fig. 4 is a fragmentary section taken on line 4—4 of Fig. 3.
Figure 5:
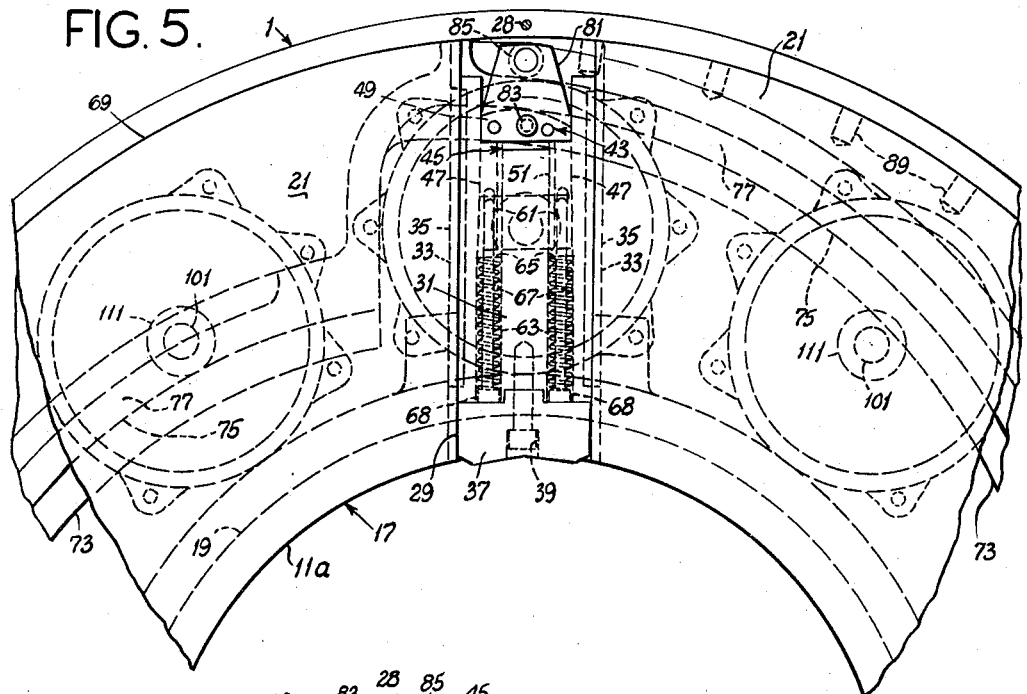
Fig. 5 is a fragmentary end elevation of Fig. 3 as viewed from the right of Fig. 3, with a cover plate removed.
Figure 6:
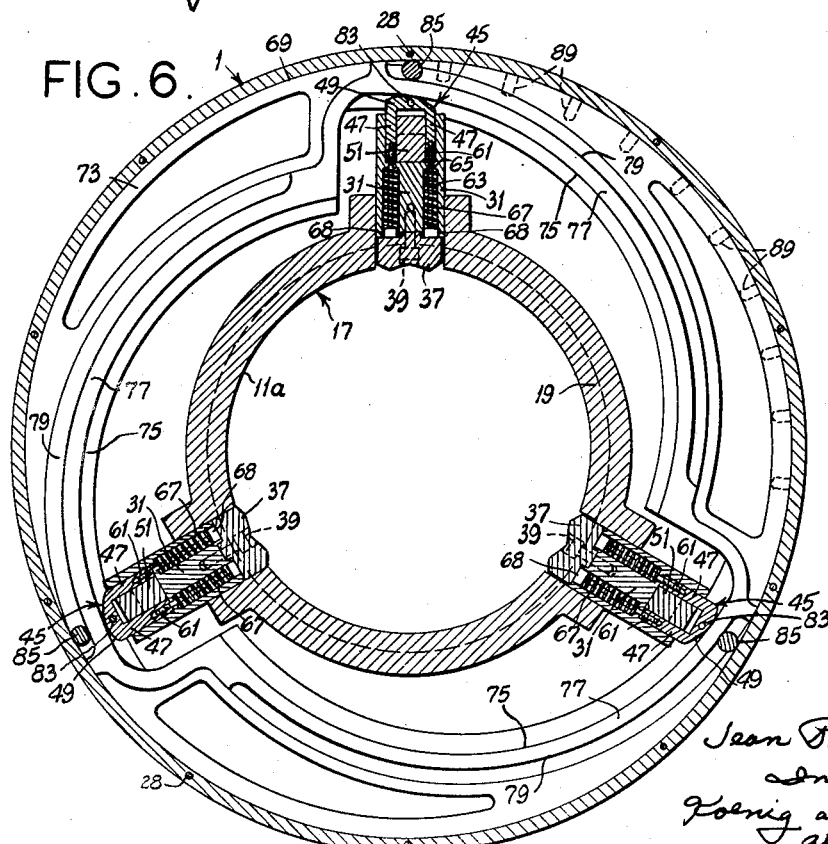
Fig. 6 is a full transverse section taken on line 6—6 of Fig. 3 on a reduced scale.
Figure 7:
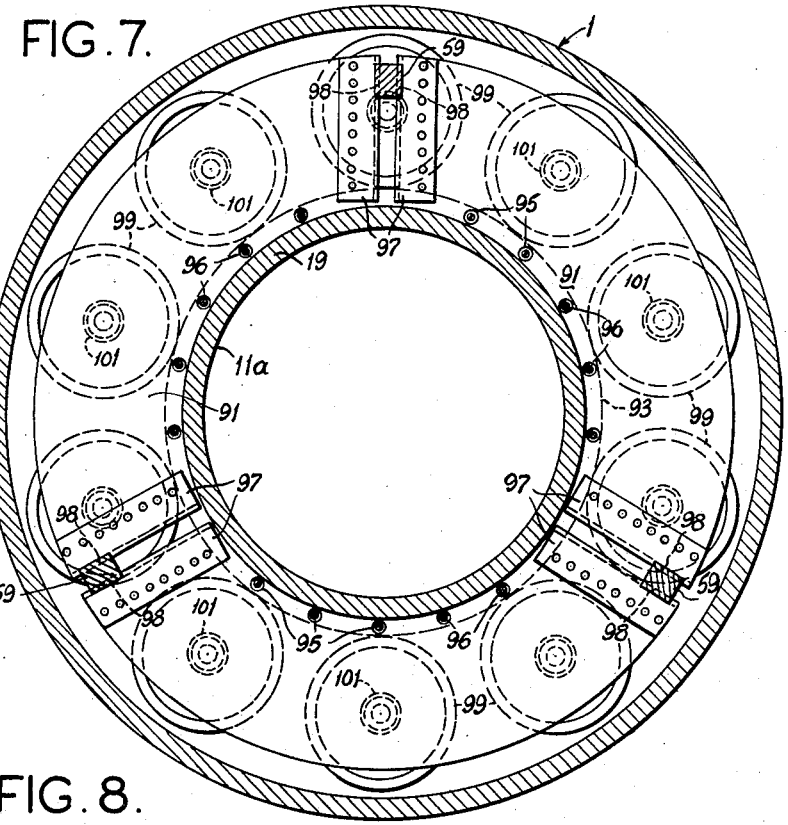
Fig. 7 is a full transverse section taken on line 7—7 of Fig. 3 on a reduced scale.
Figure 8:
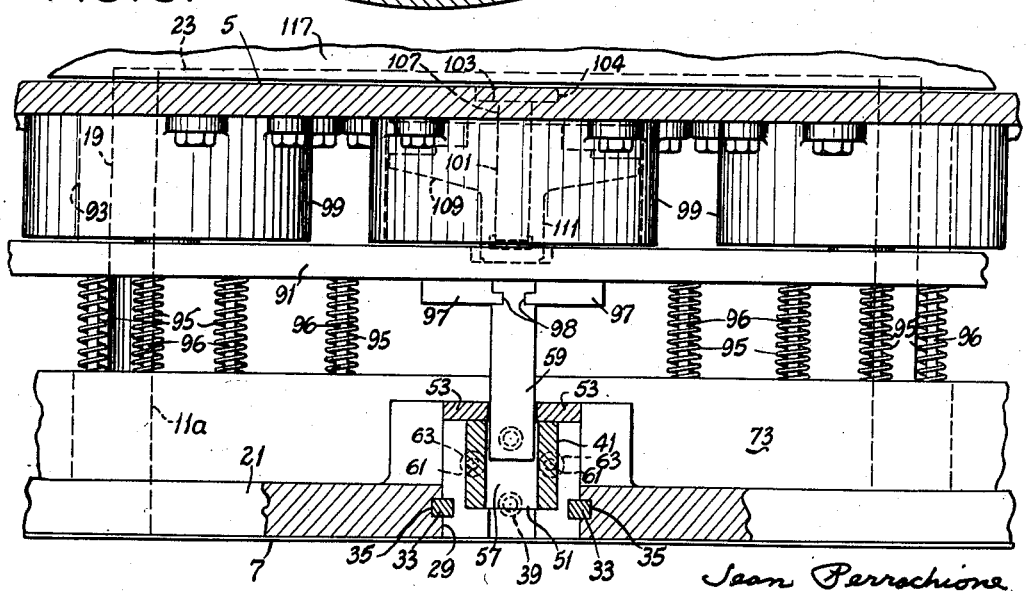
Fig. 8 is a section taken on line 8—8 of Fig. 3.

It will be observed from Fig. 3 that the die head of the pipe threading machine such as is shown in U. S. Patent 2,694,815 may be moved right up to the flat face of the chuck provided by the cover plate 7, which is substantially up to the face of the jaws 37 since the cover plate is thin. It will also be observed that the complete size range is covered in less than one-third a revolution of the cam ring, which means quick adjustment for size.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A chuck comprising an annular housing having a removable nonrotatable closure at one end, a plurality of jaw carriers mounted for radial movement in the housing adjacent said end of the housing, cam followers, one for each jaw carrier, mounted for radial movement in the housing relative to the jaw carriers and located at the outer ends of the jaw carriers, wedges mounted for axial movement in the housing and extending between the jaw carriers and the cam followers, means in the housing for moving the wedges axially in one direction or the other with the wedges free for radial movement, and a cam ring rotary in the housing for moving the followers inward and outward on rotation of the ring in opposite directions, said cam ring being located within the housing inward of said closure and adjacent said end of the housing and surrounding the followers.

2. A chuck comprising an annular housing, said housing comprising a ring having a head at one end and a removable nonrotatable closure at its other end, a plurality of jaw carriers mounted for radial movement in the housing ring adjacent said other end of the housing ring, cam followers, one for each jaw carrier, mounted for radial movement in the housing ring relative to the jaw carriers and located at the outer ends of the jaw carriers, wedges mounted for axial movement in the housing ring and extending between the jaw carriers and the cam followers, means in the housing ring between the jaw carriers and said one end of the housing ring for moving the wedges axially in one direction or the other with the wedges free for radial movement, and a cam ring rotary in the housing ring for moving the followers inward and outward on rotation of the cam ring in opposite directions, said cam ring being located within said housing ring inward of said closure and adjacent said end of the housing ring and surrounding the followers, and having internal cam surfaces engaging the outer ends of the followers.

3. A chuck comprising an annular housing having a removable nonrotatable closure at one end, a plurality of jaw carriers mounted for radial movement in the housing adjacent said end of the housing, cam followers, one for each jaw carrier, mounted for radial movement in the housing relative to the jaw carriers and located at the outer ends of the jaw carriers, wedges mounted for axial movement in the housing and extending between the jaw carriers and the cam followers, spring means connected between the cam followers and the jaw carriers biasing the jaw carriers radially outward, means in the housing between the jaw carriers and said one end of the housing for moving the wedges axially in one direction or the other with the wedges free for radial movement, and a cam ring rotary in the housing surrounding the jaw carriers for moving the followers inward and outward on rotation of the ring in opposite directions, said cam ring being located within the housing inward of said closure and surrounding the followers, the periphery of said cam ring being rotary in an internal annular recess in the annular housing, and said cam ring having internal cam surfaces engaging the outer ends of the followers.

4. A chuck comprising an annular housing, said housing comprising a ring having a head at one end and a removable nonrotatable closure at its other end, a plurality of jaw carriers mounted for radial movement in the housing ring adjacent said other end of the housing ring, cam followers, one for each jaw carrier, mounted for radial movement in the housing ring relative to the jaw carriers and located at the outer ends of the jaw carriers, wedges mounted for axial movement in the housing ring and extending between the jaw carriers and the cam followers, spring means connected between the cam followers and the jaw carriers biasing the jaw carriers radially outward, fluid pressure actuated means in the housing ring between the jaw carriers and said one end of the housing ring for moving the wedges axially in one direction or the other with the wedges free for radial movement, and a cam ring rotary in the housing ring surrounding the jaw carriers for moving the followers inward and outward on rotation of the cam ring in opposite direction, said cam ring being located within the housing ring inward of said closure and surrounding the followers, the periphery of the cam ring being rotary in an internal annular recess in the housing ring, and said cam ring having internal spiral cam surfaces engaging the outer ends of the followers.

5. A chuck comprising an annular housing, said housing comprising a ring having a head at one end and a removable nonrotatable closure at its other end, a plurality of jaw carriers mounted for radial movement in the housing ring adjacent said other end of the housing ring, cam followers, one for each jaw carrier, mounted for radial movement in the housing ring relative to the jaw carriers and located at the outer ends of the jaw carriers, wedges mounted for axial movement in the housing ring and extending between the jaw carriers and the cam followers, spring means connected between the cam followers and the jaw carriers biasing the jaw carriers radially outward, a pressure plate axially movable in the housing, radial sliding connections between said wedges and the pressure plate, a plurality of fluid pressure cylinders on the inside of the head, pistons movable in the cylinders for moving the pressure plate, and a cam ring rotary in the housing ring surrounding the jaw carriers for moving the followers inward and outward on rotation of the cam ring in opposite directions, said cam ring being located within the housing ring inward of said closure and surrounding the followers, the periphery of the cam ring being rotary in an internal annular recess in the housing ring, said cam ring having internal spiral cam surfaces engaging the outer ends of the followers for moving them inward on rotation of the cam ring in one direction, and positive-motion connections between the cam ring and followers for moving the followers outward on rotation of the cam ring in the opposite direction.

6. A chuck comprising an annular housing, said housing comprising a ring having a head at one end and a removable nonrotatable cover plate at its other end, a plurality of jaw carriers mounted for radial movement in the housing ring adjacent said other end of the housing ring, each jaw carrier having a radially outer end face inclined toward the chuck axis in the direction toward said head, a cam ring rotary in said housing ring at said other end of the housing ring, cam followers, one for each jaw carrier, having a positive-motion connection to the cam ring and movable radially inward and outward on rotation of the cam ring in opposite directions, said cam ring being located within the housing ring inward of said closure and surrounding the followers, wedges interposed between the cam followers and said inclined faces of the jaw carriers, spring means biasing the jaw carriers radially outward toward the followers, a pressure plate axially slidable in the housing ring, said wedges having radial sliding connections with said pressure plate, spring means biasing said pressure plate in the direction toward said head, and fluid pressure means between said head and pressure plate for moving the pressure plate and wedges toward said other end of the housing ring.

7. A chuck comprising an annular housing, said housing comprising a ring having a head at one end, said head being formed with a hub having a central opening, a sleeve extending from the hub coaxially with the central opening in the hub toward the other end of the housing ring, a flange on said sleeve at said other end of the housing ring, said flange having a plurality of radial slots, a jaw carrier slidable in each slot, each jaw carrier having a radially outer end face inclined toward the chuck axis in the direction toward said head, a cam ring rotary in said housing ring at said other end of the housing ring, cam followers, one for each jaw carrier, having a positive-motion connection to the cam ring and movable radially inward and outward on rotation of the cam ring in opposite directions, wedges interposed between the cam followers and said inclined faces of the jaw carriers, spring means biasing the jaw carriers radially outward toward the followers, a pressure plate slidable on the sleeve, said wedges having radial sliding connections with said pressure plate, spring means biasing said pressure plate in the direction toward said head, fluid pressure means between said head and pressure plate for moving the pressure plate and wedges toward said other end of the housing ring, and a cover plate removably fixed on said other end of the housing ring, said cam ring being on the inside of said cover plate within said housing surrounding said cam followers, and having its periphery rotary in an internal annular recess in the housing ring.

8. A chuck comprising an annular housing, said housing comprising a ring having a head at one end, said head being formed with a hub having a central opening, a sleeve extending from the hub coaxially with the central opening in the hub toward the other end of the ring, a flange on said sleeve at said other end of the ring, said flange having a plurality of radial slots, a jaw carrier slidable in each slot, each jaw carrier having a pressure block having a radially outer end face inclined toward the chuck axis in the direction toward said head, a cam ring rotary in said housing ring at said other end of the housing ring, said cam ring being internally formed with a plurality of spiral cam surfaces and being formed on its face toward said other end of the housing ring with a corresponding plurality of spiral cam ridges, cam followers, one for each jaw carrier, having portions engaging said internal spiral surfaces of the cam ring and rollers engaging the outer surfaces of the ridges and being movable radially inward and outward on rotation of the cam ring in opposite directions, wedges interposed between the followers and said inclined faces of the pressure blocks, spring means biasing the jaw carriers radially outward toward the followers, a pressure plate slidable on the sleeve, said wedges having radial sliding connections with said pressure plate, spring means biasing said pressure plate in the direction toward said head, fluid pressure means between said head and pressure plate for moving the pressure plate and wedges toward said other end of the housing ring, and a cover plate for said other end of the housing ring.

9. A chuck as set forth in claim 8 wherein the cam ring has a peripheral series of sockets for receiving a handle and the housing ring has a slot for entry of the handle.

10. A chuck as set forth in claim 8 wherein said fluid pressure means comprises a plurality of air cylinders on the inside of said head, pistons in the air cylinders engaging the pressure plate, and a distributor ring on the hub, with passages through the hub to the cylinders.

References Cited in the file of this patent
UNITED STATES PATENTS

| | | |
|---|---|---|
| 2,356,198 | Barry et al. | Aug. 22, 1944 |
| 2,597,280 | Barnes | May 20, 1952 |
| 2,711,904 | Gartner et al. | June 28, 1955 |